(12) United States Patent
Hazama

(10) Patent No.: US 7,506,637 B2
(45) Date of Patent: Mar. 24, 2009

(54) FUEL FEED APPARATUS

(75) Inventor: Tadashi Hazama, Chita-gun (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/637,751

(22) Filed: Dec. 13, 2006

(65) Prior Publication Data

US 2007/0181102 A1 Aug. 9, 2007

(30) Foreign Application Priority Data

Feb. 6, 2006 (JP) ............................. 2006-028077

(51) Int. Cl.
*F02M 37/00* (2006.01)
(52) U.S. Cl. ...................................... 123/510; 123/514
(58) Field of Classification Search ................. 123/497, 123/509, 514, 456, 510
See application file for complete search history.

(56) References Cited

U.S. PATENT DOCUMENTS

| | | | | |
|---|---|---|---|---|
| 4,532,893 A * | 8/1985 | Day et al. | ................. | 123/41.31 |
| 5,613,476 A * | 3/1997 | Oi et al. | ........................ | 123/509 |
| 5,762,048 A * | 6/1998 | Yonekawa | ................... | 123/514 |
| 6,502,558 B1 * | 1/2003 | Brunel | ........................ | 123/509 |
| 6,532,941 B2 * | 3/2003 | Begley et al. | ................ | 123/497 |
| 6,802,301 B2 * | 10/2004 | Fauser et al. | ................. | 123/509 |
| 2004/0173187 A1 * | 9/2004 | Kanamaru et al. | ........... | 123/509 |
| 2004/0226541 A1 | 11/2004 | Crary et al. | | |
| 2005/0034710 A1 | 2/2005 | Crary et al. | | |
| 2005/0133430 A1 * | 6/2005 | de Savasse et al. | ........... | 210/234 |
| 2005/0155583 A1 * | 7/2005 | Mitsudou et al. | ............. | 123/509 |

FOREIGN PATENT DOCUMENTS

| | | |
|---|---|---|
| GB | 2 293 895 A | 4/1996 |
| JP | 7-293397 | 11/1995 |
| JP | 2002-242781 | 8/2002 |

* cited by examiner

*Primary Examiner*—Thomas N Moulis
(74) *Attorney, Agent, or Firm*—Nixon & Vanderhye PC

(57) ABSTRACT

A fuel feed apparatus connects with an injector and a reservoir tank. The reservoir tank is in upstream of the injector for accumulating fuel for the injector. A fuel pump press-feeds fuel in a fuel tank toward the reservoir tank in accordance with pressure in the reservoir tank. A press-feed pipe defines a fuel passage from the fuel pump to the reservoir tank. A branch pipe is provided to the press-feed pipe. The branch pipe defines a return passage that branches from the fuel passage. Fuel discharged from the fuel pump returns into the fuel tank through the return passage. A throttle unit is provided to the branch pipe for reducing a sectional area of the return passage. A relief valve is provided to the branch pipe for communicating the return passage when pressure in the return passage becomes equal to or greater than relief pressure.

7 Claims, 3 Drawing Sheets

FUEL FEED APPARATUS

CROSS REFERENCE TO RELATED APPLICATIONS

This application is based on and incorporates herein by reference Japanese Patent Application No. 2006-28077 filed on Feb. 6, 2006.

FIELD OF THE INVENTION

The present invention relates to a fuel feed apparatus.

BACKGROUND OF THE INVENTION

Conventionally, a fuel feed apparatus includes a fuel pump that press-feeds fuel from a fuel tank into a reservoir tank. Fuel in the reservoir tank is maintained at predetermined pressure, and the fuel is sprayed into an internal combustion engine through an injector.

According to JP-A-7-293397, the fuel feed apparatus controls the fuel pump in accordance with pressure in the reservoir tank, thereby regulating pressure in the reservoir tank to be less than upper limit pressure. In this structure of the fuel feed apparatus, a passage, through which fuel returns from the reservoir tank into the fuel tank, is not provided. This structure constructs a return-less system.

However, in this structure of JP '397, when electricity supply to the fuel pump is terminated for stopping fuel injection through the injector, the fuel pump cannot immediately stop due to inertia. Accordingly, in this condition, pressure of fuel in the reservoir tank may exceed target pressure. In this return-less system, when pressure in the reservoir tank becomes excessively high, the excessive pressure in the reservoir tank is maintained as long as the injection port of the injector is not communicated. Accordingly, when fuel injection is restarted after terminating previous fuel injection, the amount of fuel injected through the injector is hardly controlled.

SUMMARY OF THE INVENTION

The present invention addresses the above disadvantage. According to one aspect of the present invention, a fuel feed apparatus connects with a fuel tank, an injector, and a reservoir tank. The injector is adapted to injecting fuel. The reservoir tank is arranged in upstream of the injector with respect to fuel flow for accumulating fuel for the injector. The fuel feed apparatus includes a fuel pump that press-feeds fuel from the fuel tank toward the reservoir tank in accordance with pressure in the reservoir tank. The fuel feed apparatus further includes a press-feed pipe that defines a fuel passage from the fuel pump to the reservoir tank. The fuel feed apparatus further includes a branch pipe that is provided to the press-feed pipe. The branch pipe defines a return passage that branches from the fuel passage. Fuel discharged from the fuel pump returns into the fuel tank through the return passage. The fuel feed apparatus further includes a throttle unit that is provided to the branch pipe for reducing a sectional area of the return passage. The fuel feed apparatus further includes a relief valve that is provided to the branch pipe. The relief valve communicates the return passage when pressure of fuel in the return passage becomes equal to or greater than relief pressure.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

First Embodiment

Figure 1:
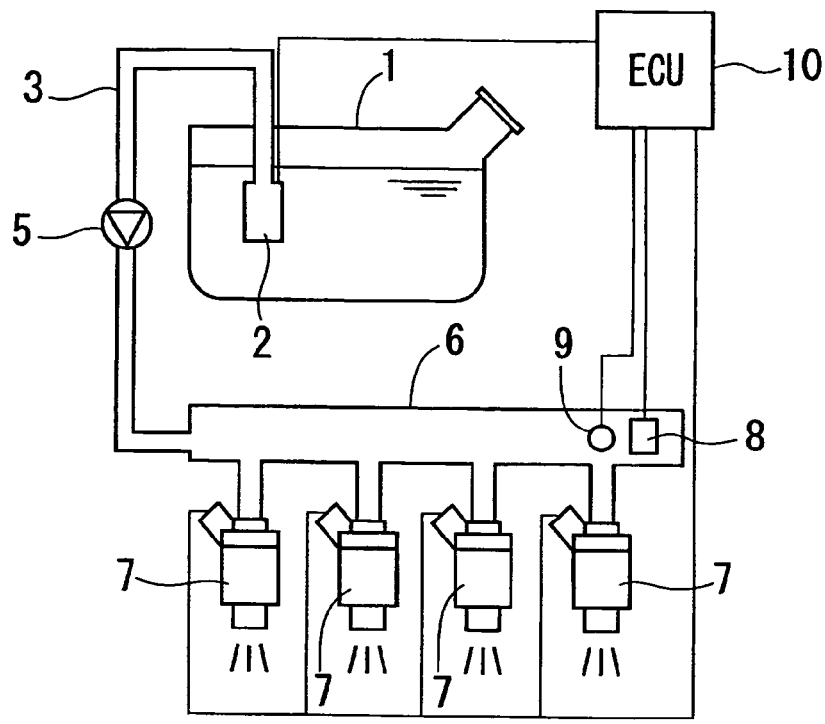
FIG. 1 is a schematic diagram showing a fuel feed system including a fuel feed apparatus according to a first embodiment.
Figure 2:
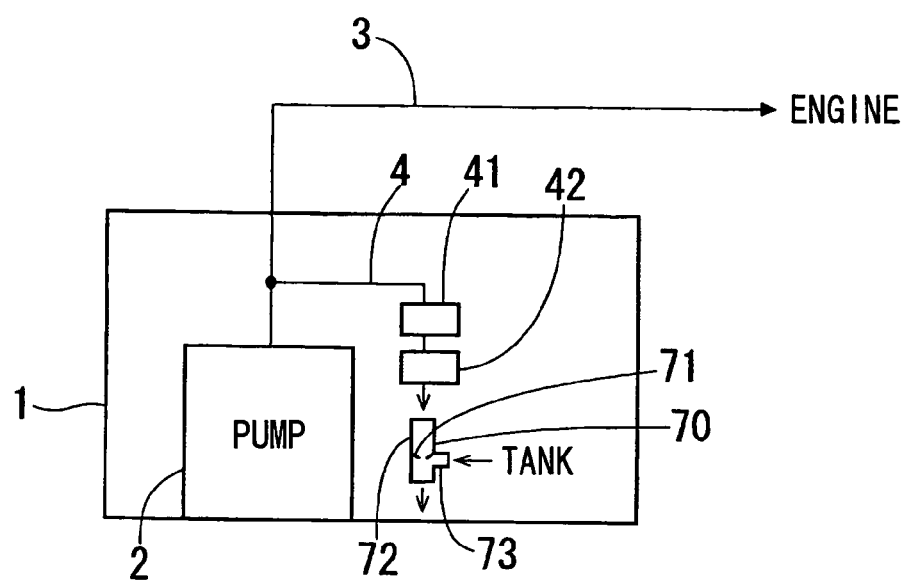
FIG. 2 is a schematic diagram showing a fuel pump of the fuel feed system.

A fuel feed apparatus is mounted to a vehicle having an internal combustion engine such as a gasoline engine. As shown in FIGS. 1, 2, the fuel feed apparatus includes an electric fuel pump 2. The fuel feed apparatus electrically connects with a control device 10 that electrically connects with a fuel pressure sensor 8 and a fuel temperature sensor 9. The fuel feed apparatus is applied to a return-less system that includes a fuel tank 1, a press-feed pipe 3, a branch pipe 4, a check valve 5, a reservoir tank 6, and an injector 7.

The fuel pump 2 is accommodated in the fuel tank 1 for drawing fuel from the fuel tank 1, thereby press-feeding the fuel from the fuel tank 1. The press-feed pipe 3 defines a high pressure fuel passage that extends from the fuel pump 2 to the reservoir tank 6. The check valve 5 is provided to the press-feed pipe 3. The fuel pump 2 press-feeds fuel into the reservoir tank 6 through the press-feed pipe 3 and the check valve 5. The check valve 5 restricts fuel from causing reverse flow into the fuel pump 2. The check valve 5 maintains fuel pressure P in the reservoir tank 6 when the injector 7 is blocked therein to be in a valve closing condition and the fuel pump 2 is stopped.

The reservoir tank 6 temporarily accumulates fuel, which is press-fed from the fuel pump 2, at predetermined pressure. The reservoir tank 6 absorbs fluctuation in pressure of fuel, which is press-fed from the fuel pump 2. Fuel accumulated in the reservoir tank 6 is sprayed into unillustrated combustion chambers of the engine through multiple injectors 7 at substantially constant fuel pressure.

The control device 10 controls an operation of the fuel pump 2 in accordance with pressure in the reservoir tank 6. Thereby, the control device 10 controls the fuel pressure P in the reservoir tank 6 at substantially constant pressure, regardless of the amount of fuel injected through the injector 7. In this embodiment, the return-less-system does not include a pipe for returning fuel from the reservoir tank 6 into the fuel tank 1.

The fuel pressure sensor 8 is provided in the reservoir tank 6 for detecting fuel pressure P in the reservoir tank 6. The fuel pressure sensor 8 outputs a detection signal of the fuel pressure P to the control device 10. The control device 10 compares predetermined target fuel pressure Po with the fuel pressure P, thereby controlling voltage applied to an electric motor of the fuel pump 2. Thus, the control device 10 controls an amount of fuel discharged from the fuel pump 2, so that the control device 10 controls the fuel pressure P in the reservoir tank 6 at substantially constant system pressure.

The fuel temperature sensor 9 is provided in the reservoir tank 6 for detecting fuel temperature in the reservoir tank 6. The fuel temperature sensor 9 outputs a detection signal of the fuel temperature to the control device 10. The control device 10 corrects the target fuel pressure Po in accordance with the detection signal of the fuel temperature.

The branch pipe 4 is provided to the press-feed pipe 3. The branch pipe 4 defines a return passage that branches from the fuel passage. Fuel discharged from the fuel pump 2 returns into the fuel tank 1 through the return passage. The branch pipe 4 is provided with a pressure regulator 42 that serves as a relief valve for releasing pressure. The branch pipe 4 has a throttle portion 41 in the upstream of the pressure regulator 42.

As referred to FIG. 2, a jet pump 70 operates by utilizing kinetic energy of fuel passing through the return passage as a driving source. The jet pump 70 serves as a transfer pump. The jet pump 70 is constructed of a jet nozzle 71, a casing 72, and an inlet pipe 73. The jet nozzle 71 communicates with an outlet 45 (FIG. 3) in the downstream end of the branch pipe 4. The jet nozzle 71 jets fuel by utilizing discharge pressure generated by fuel flowing through the outlet 45. The casing 72 accommodates the jet nozzle 71. The casing 72 defines a chamber therein. The casing 72 generates suction pressure in the chamber by jetting fuel through the jet nozzle 71. The inlet pipe 73 communicates with the chamber defined in the casing 72.

Figure 3:
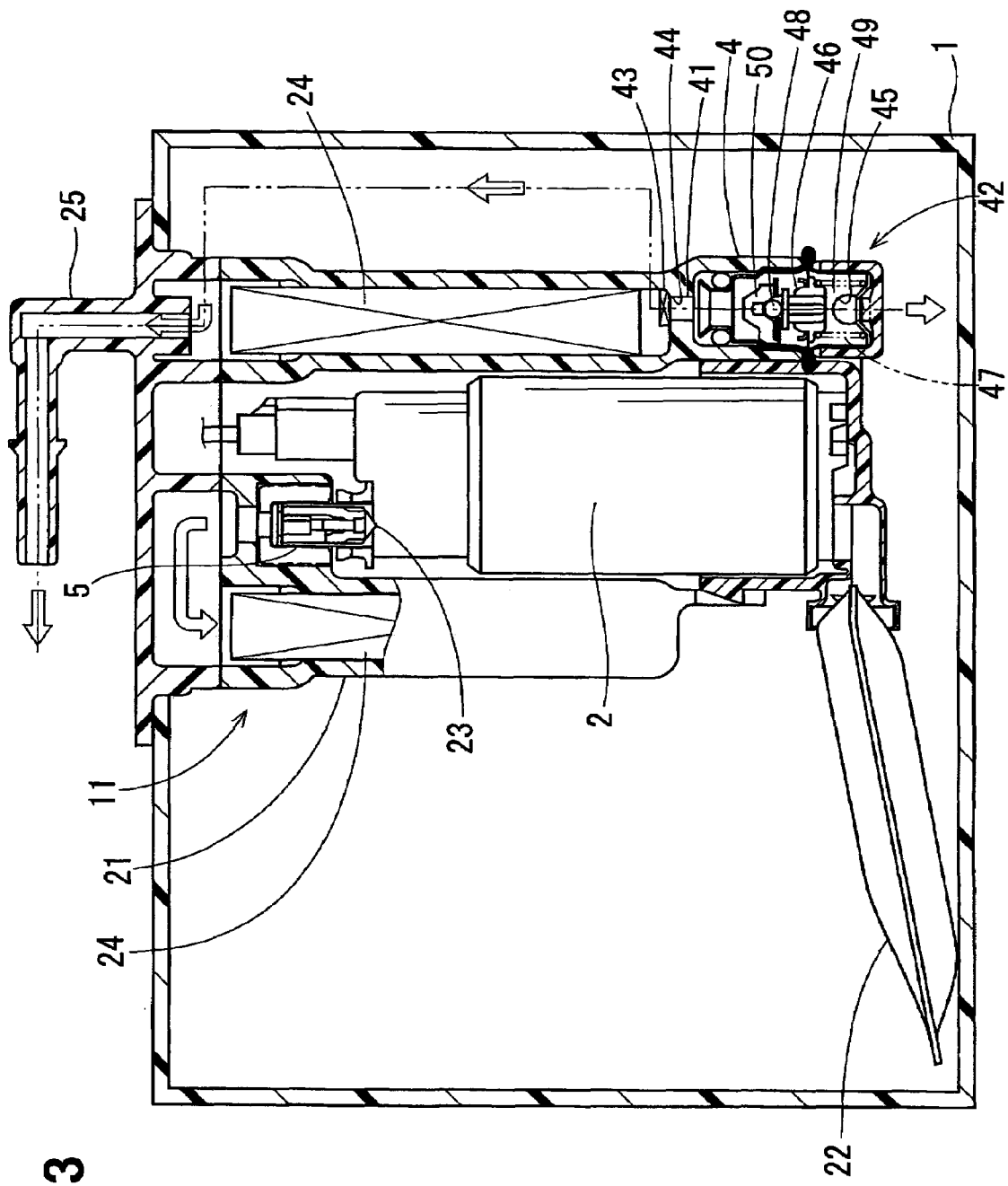
FIG. 3 is a sectional view showing the fuel pump in a fuel tank.

In this structure, fuel is jetted through the jet nozzle 71, thereby generating suction force in the chamber, so that fuel is drawn into the chamber through the inlet pipe 73 by the suction force. The fuel drawn into the chamber is discharged through the jet pump 70 together with fuel jetted through the jet nozzle 71. In FIG. 3, the jet pump 70 is unillustrated.

As shown in FIG. 3, the fuel pump 2 is accommodated in a housing 21 formed of resin. The housing 21 is provided with the pressure regulator 42 and the throttle portion 41. The housing 21, the fuel pump 2, the pressure regulator 42, and the throttle portion 41 construct an integrated fuel pump unit 11.

Next, the fuel pump unit 11 is described in detail with reference to FIG. 3. The fuel pump 2 accommodates an unillustrated motor therein. The fuel pump 2 further accommodates an unillustrated rotor member such as an impeller that has vanes in the outer circumferential periphery thereof. The rotor member rotates together with the motor. The fuel pump 2 generates suction force by utilizing rotation of the rotor member. A suction filter 22 is provided to the upstream of the fuel pump 2. The suction filter 22 removes relatively large foreign matters contained in fuel drawn from the fuel tank 1 into the fuel pump 2. A fuel filter is provided for removing relatively small foreign matters contained in fuel discharged from the fuel pump 2.

The fuel pump 2 has a discharge portion 23 in the top thereof. The discharge portion 23 is provided with the check valve 5. The fuel pump 2 draws fuel thereinto through the suction filter 22, and discharges the fuel from the discharge portion 23 through the check valve 5. The outer circumferential periphery of the fuel pump 2 is surrounded by a filter element 24 in the housing 21. The filter element 24 is in a substantially cylindrical shape. The filter element 24 is constructed of a filter paper, which is in a honeycomb shape, or a torx filter, for example. Fuel flows through the check valve 5, and the fuel is discharged through the discharge pipe 25, which is arranged in the top of the housing 21, after passing through the filter element 24. The fuel discharged through the discharge pipe 25 flows into the reservoir tank 6 after passing through the press-feed pipe 3.

The housing 21 defines a passage therein. Fuel discharged from the discharge portion 23 of the fuel pump 2 passes through the passage in the housing 21. The check valve 5 and the filter element 24 are provided to the passage in the housing 21. The passage defined by the discharge portion 23, the check valve 5, the filter element 24, the discharge pipe 25, the press-feed pipe 3, and the inlet of the reservoir tank 6 serve as a fuel passage. The discharge pipe 25 and the fuel passage defined in the housing 21 serve as a discharge pipe.

The branch pipe 4 is formed of resin integrally with a bottom portion of the housing 21 on the lower side of the filter element 24 in FIG. 3. The branch pipe 4 defines the return passage therein. The return passage branches from part of the fuel passage defined between the filter element 24 and the discharge pipe 25.

The branch pipe 4 is provided with a filter 43, the throttle portion 41, and the pressure regulator 42 in this order from the upstream thereof. The throttle portion 41 defines a substantially circular hole 44 for reducing the sectional area of the return passage. The hole 44 has the opening area of about 0.8 mm$^2$. In this embodiment, the hole 44 is defined in an orifice. Alternatively, the hole 44 may be defined in a nozzle. The hole 44 is provided in the return passage, thereby serving as an orifice, so that the flow amount of fuel passing through the return passage is regulated.

When pressure of fuel in the return passage becomes equal to or greater than the predetermined relief pressure, the pressure regulator 42 communicates the return passage, so that the pressure regulator 42 controls pressure of fuel, which flows from the fuel pump 2 through the filter element 24, at predetermined pressure. The predetermined relief pressure may be set such that the predetermined relief pressure is biased by a specific value with respect to either the fuel pressure P in the reservoir tank 6 or the atmospheric pressure, for example. Fuel flows through the filter element 24, and the fuel flows out of the outlet 45 after being controlled in pressure through the pressure regulator 42. Fuel is partially recirculated as surplus fuel from the pressure regulator 42 into the fuel tank 1.

In this embodiment, the pressure regulator 42 is a diaphragm type regulator that includes a diaphragm 46, a spring 47, a valve member 48, and the like. The diaphragm 46 partitions the interior of the pressure regulator 42 into a spring chamber 49 and a fuel chamber 50. The spring 47 is provided in the spring chamber 49 to apply biasing force to the diaphragm 46. The valve member 48 communicates and blocks a passage defined in the fuel chamber 50 in conjunction with the operation of the diaphragm 46.

When pressure in the fuel chamber 50 becomes equal to or greater than a pressure value, the diaphragm 46 operates the valve member 48 to communicate the passage in the fuel chamber 50. The pressure value is a summation of the pressure in the spring chamber 49 and pressure applied to the surface of the diaphragm 46 by the biasing force of the spring 47. Thus, the return passage communicates, so that fuel in the fuel passage flows into the fuel tank 1 through the return passage. In this embodiment, the spring chamber 49 communicates with the reservoir tank 6. Therefore, pressure in the spring chamber 49 is substantially equal to pressure in the reservoir tank 6.

Next, an operation of the fuel feed apparatus is described.

When the fuel pressure P in the reservoir tank 6 becomes less than the target fuel pressure Po, the control device 10 applies voltage to the motor of the fuel pump 2. When the fuel pressure P in the reservoir tank 6 becomes greater than the target fuel pressure Po, the control device 10 terminates applying the voltage to the motor of the fuel pump 2. When the motor is applied with voltage, the fuel pump 2 starts the operation thereof. Fuel flows from the fuel tank 1 into the reservoir tank 6 after passing through the suction filter 22, the fuel pump 2, the check valve 5, the filter element 24, the discharge pipe 25, and the press-feed pipe 3.

When the amount of fuel injected from the injector 7 increases in a case, in which the vehicle accelerates, for example, the control device 10 continuously operates the fuel pump 2, thereby controlling the pressure in the reservoir tank 6 at the predetermined system pressure. However, when the accelerated vehicle is decelerated, the fuel injection from the injector 7 needs to be terminated. In this case, even when the control device 10 terminates the voltage applied to the fuel pump 2, the fuel pump 2 does not immediately stop due to inertial force thereof.

In this embodiment, the return passage branches from the fuel passage, thereby returning fuel into the fuel tank 1 therethrough. When pressure of fuel in the return passage becomes equal to or greater than the predetermined relief pressure, the pressure regulator 42 communicates the return passage. In this operation, even when the fuel pump 2 continues rotation after the control device 10 terminates applying voltage to the fuel pump 2, pressure in the fuel passage, which is equal to or greater than the relief pressure, can be released to the return passage. Thus, the interior of the reservoir tank 6 can be protected from being in overpressure equal to or greater than the relief pressure therein. In addition, when the injector 7 restarts fuel injection after terminating previous fuel injection, the amount of fuel injection can be properly controlled.

Furthermore, in this embodiment, the throttle portion 41 defines the hole 44, which is in a shape serving as an orifice. Therefore, an amount of fuel flowing through the return passage can be regulated when pressure in the fuel passage becomes equal to or greater than the relief pressure in a normal operation, in which the fuel pump 2 is continuously applied with voltage. Thus, energy loss of the fuel pump 2 can be reduced.

In addition, the pressure regulator 42 blocks the return passage as long as the pressure in the fuel passage is less than the relief pressure. Therefore, when the injector 7 restarts fuel injection after terminating previous fuel injection, the pressure in the reservoir tank 6 can be restricted from becoming less than the relief pressure. Therefore, the pressure in the reservoir tank 6 can be maintained at necessary and minimal pressure, so that the injection amount can be quickly controlled at the target injection amount when the injection is restarted.

According to a study conducted by the inventor, about 60 liters of fuel per unit time is needed to flow through the outlet 45 for operating the jet pump 70. When the opening area of the hole 44 is set at about 0.8 mm$^2$, the amount of fuel flowing from the outlet 45 is about 60 liters per unit time.

For example, when the vehicle is accelerated, the injection amount of fuel through the injector 7 becomes large and pressure in the fuel passage becomes equal to or greater than the relief pressure. In such a condition, when the fuel pump 2 is continuously operated, fuel flows from the outlet 45 through the return passage. Accordingly, in such a condition, as the amount of fuel flowing through the outlet 45 becomes large, energy loss of the fuel pump 2 becomes large.

In this embodiment, the opening area of the hole 44 is set at about 0.8 mm$^2$, so that the amount of fuel flowing through the outlet 45 for operating the jet pump 70 can be reduced. Therefore, the amount of fuel flowing through the outlet 45 can be set at a necessary and minimal value in the continuous operation. Thus, energy loss of the fuel pump 2 can be possibly reduced. In addition, the amount of fuel flowing through the outlet 45 can be set at a necessary and minimal value, so that the structure in this embodiment can be applied to a fuel feed apparatus, which does not include the jet pump 70. Therefore, commonality of components can be achieved between the fuel feed apparatus, which includes the jet pump 70, and a fuel feed apparatus, which does not include the jet pump 70.

The fuel feed apparatus includes the filter 43 for removing foreign matters contained in fuel. The filter 43 is provided upstream of the throttle portion 41 in the return passage. Foreign matters contained in fuel are captured through the filter 43 before flowing into the throttle portion 41, so that blockade of the throttle portion 41 due to foreign matters can be restricted.

The fuel feed apparatus includes the housing 21 that accommodates the fuel pump 2 therein. The housing 21 is provided with the pressure regulator 42 and the throttle portion 41. The fuel pump 2, the pressure regulator 42, and the throttle portion 41 can be integrated using the housing 21, so that an assembling work for the fuel pump 2, the pressure regulator 42, and the throttle portion 41 can be facilitated.

Second Embodiment

Figure 4:
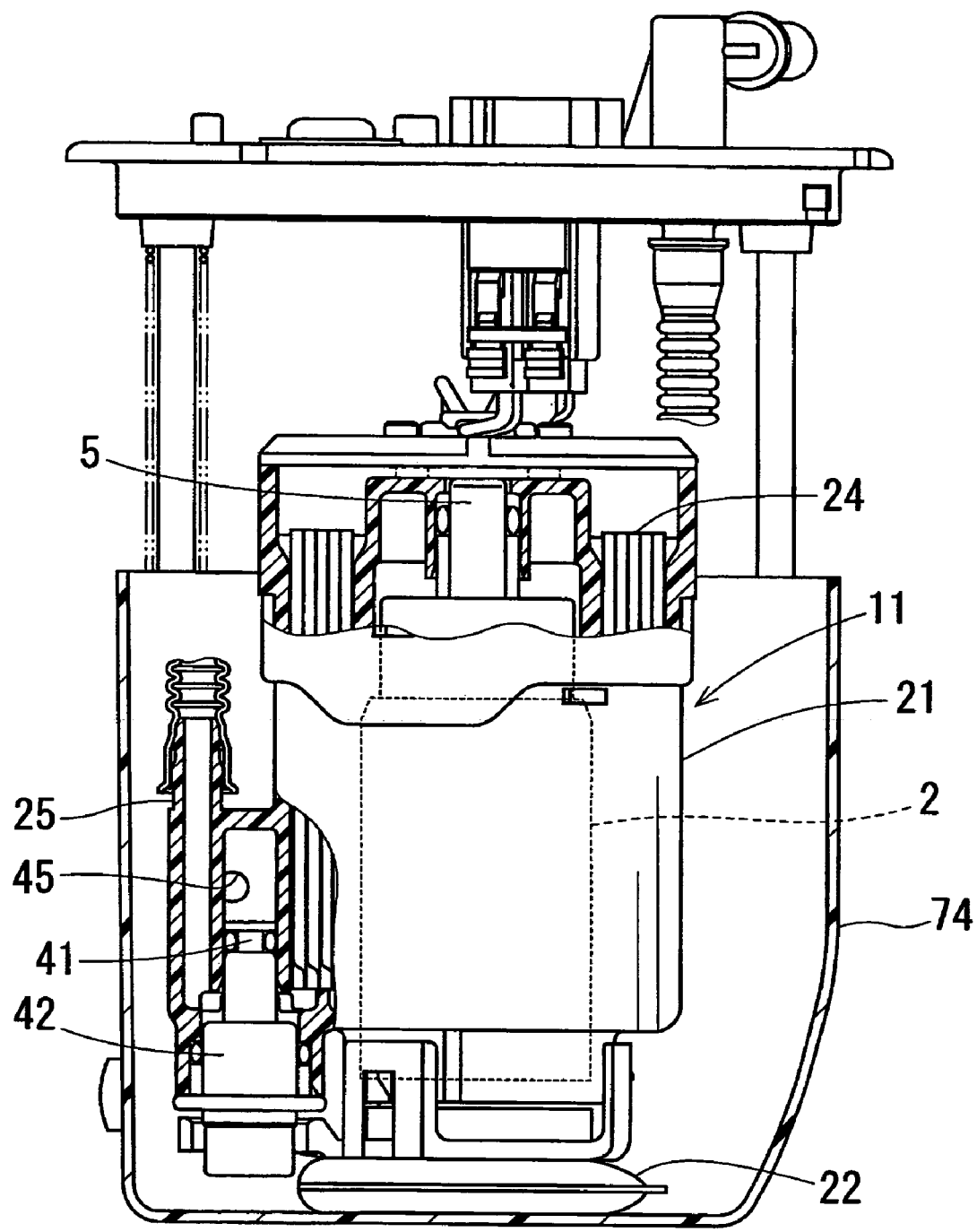
FIG. 4 is a sectional view showing a fuel pump according to a second embodiment.

In the first embodiment, the throttle portion 41 is provided upstream of the pressure regulator 42 in the branch pipe 4. By contrast, in this embodiment, as shown in FIG. 4, the throttle portion 41 is provided downstream of the pressure regulator 42 in the branch pipe 4. In addition, in this embodiment, a sub-tank 74 is provided in the fuel tank 1, and the fuel pump unit 11 is provided in the sub-tank 74. The jet pump 70 described in the first embodiment may be provided to the fuel feed apparatus in this embodiment for transferring fuel from the fuel tank 1 into the sub-tank 74.

In the fuel feed apparatus, the jet pump 70 operates by utilizing kinetic energy of fuel passing through the return passage as a driving source. Therefore, energy loss of the fuel pump 2 can be possibly reduced.

When the sub-tank 74 accommodating the fuel pump 2 is provided in the fuel tank 1, the jet pump 70 may be used for transferring fuel from the fuel tank 1 into the sub-tank 74. Alternatively, when the fuel tank is in a shape in which fuel is accumulated in two or more accumulating portions, the jet pump 70 may be used for transferring fuel from one of the accumulating portions to another of the accumulating portions.

Other Embodiment

In the first embodiment, as referred to FIG. 3, the pressure regulator 42 is located downstream of the check valve 5. Alternatively, the pressure regulator 42 may be located upstream of the check valve 5.

The filter 43 may be provided downstream of the throttle portion 41 in the return passage. The filter 43 may be omitted.

The above structures of the embodiments can be combined as appropriate.

Various modifications and alternations may be diversely made to the above embodiments without departing from the spirit of the present invention.

What is claimed is:

1. A fuel feed apparatus for pumping fuel from a fuel tank to a reservoir tank, which is configured to accumulate fuel to be injected from an injector, the fuel feed apparatus comprising:

a fuel pump configured to pump fuel from the fuel tank to the reservoir tank through a fuel passage in accordance with pressure in the reservoir tank;

a branch pipe that branches from the fuel passage to the fuel tank and defines therein a return passage;

a relief valve provided to the branch pipe and configured to open the return passage when pressure in the return passage is equal to or greater than a predetermined pressure; and a throttle unit provided to the branch pipe upstream of the relief valve;

a pressure detection unit configured to detect pressure in the reservoir tank; and a control unit configured to control the fuel pump so that the pressure in the reservoir tank as detected by the pressure detection unit is maintained at a predetermined pressure, wherein the return passage is reduced to be equal to or less than 0.8 mm$^2$ in sectional area at the throttle unit.

2. The fuel feed apparatus according to claim 1, wherein the relief valve is a diaphragm type valve.

3. The fuel feed apparatus according to claim 1, further comprising:

a jet pump including a jet nozzle communicating with a downstream end of the branch pipe for jetting fuel by being applied with pressure of fuel in the branch pipe.

4. The fuel feed apparatus according to claim 1, further comprising:

a filter provided in the return passage, upstream of the throttle, unit for removing foreign matter from fuel flowing therethrough.

5. The fuel feed apparatus according to claim 1, further comprising:

a housing that accommodates the fuel pump therein, wherein the throttle unit and the relief valve are accommodated in the housing.

6. The fuel feed apparatus according to claim 1, wherein the relief valve includes a diaphragm that partitions an interior of the relief valve, and the relief valve further includes a valve member that communicates and blocks the return passage in conjunction with pressure applied to the diaphragm.

7. The fuel feed apparatus according to claim 3, wherein the jet pump further includes a casing that accommodates the jet nozzle, the casing defining a chamber therein, the chamber generating suction pressure by jetting fuel through the jet nozzle, and the jet pump further includes an inlet pipe that communicates with the chamber for introducing fuel toward the chamber by the suction pressure.

* * * * *